(12) United States Patent
Kiyofuji et al.

(10) Patent No.: US 9,845,718 B2
(45) Date of Patent: Dec. 19, 2017

(54) EXHAUST EMISSION CONTROL APPARATUS FOR ON-BOARD INTERNAL COMBUSTION ENGINE, AND METHOD FOR EXHAUST EMISSION CONTROL APPARATUS

(71) Applicants: TOYOTA JIDOSHA KABUSHIKI KAISHA, Toyota-shi (JP); KABUSHIKI KAISHA TOYOTA JIDOSHOKKI, Kariya-shi (JP)

(72) Inventors: Takahiro Kiyofuji, Toyota (JP); Kingo Suyama, Toyota (JP); Gaku Kishimoto, Nagoya (JP); Atsushi Kidokoro, Obu (JP)

(73) Assignees: TOYOTA JIDOSHA KABUSHIKI KAISHA, Toyota-shi (JP); KABUSHIKI KAISHA TOYOTA JIDOSHOKKI, Kariya-shi (JP)

( * ) Notice: Subject to any disclaimer, the term of this patent is extended or adjusted under 35 U.S.C. 154(b) by 0 days.

(21) Appl. No.: 15/079,771

(22) Filed: Mar. 24, 2016

(65) Prior Publication Data

US 2016/0281568 A1 Sep. 29, 2016

(30) Foreign Application Priority Data

Mar. 26, 2015 (JP) .................. 2015-064501

(51) Int. Cl.
- *B60Q 1/00* (2006.01)
- *F01N 3/20* (2006.01)
- *B60K 37/02* (2006.01)

(52) U.S. Cl.
CPC .............. *F01N 3/208* (2013.01); *B60K 37/02* (2013.01); *F01N 3/2066* (2013.01);
(Continued)

(58) Field of Classification Search
CPC ................ F01N 3/208; F01N 2610/02; F01N 2900/1814; F01N 2560/026; F01N 3/2066;
(Continued)

(56) References Cited

U.S. PATENT DOCUMENTS

| 4,400,779 A | 8/1983 | Kosuge et al. |
| 7,685,813 B2 * | 3/2010 | McCarthy, Jr. ....... F01N 3/0842 60/274 |

(Continued)

FOREIGN PATENT DOCUMENTS

| DE | 10 2011 104 391 A1 | 12/2012 |
| JP | 56-140216 A | 11/1981 |

(Continued)

OTHER PUBLICATIONS

"SCR for Passenger Car Applications—AdBlue Is Becoming a Commodity for Smaller Cars" Verband der Automobilindustrie, http://alumag.com/wp-content/uploads/2013/10/AdblueVDA_AdBlue_Infrastructure_Status_June2009.pdf, XP055347031, Jun. 2009, 19 pages.

*Primary Examiner* — Thomas Mullen
(74) *Attorney, Agent, or Firm* — Oblon, McClelland, Maier & Neustadt, L.L.P.

(57) ABSTRACT

A controller calculates a period travel distance that is a travel distance of the vehicle from when the available travel distance is calculated to when the available travel distance is calculated next. The controller, when the remaining amount of urea aqueous solution inside a tank exceeds a predetermined amount, executes a first calculation process in which the available travel distance is calculated with reference to the remaining amount of the urea aqueous solution. The controller, after the remaining amount of the urea aqueous solution becomes smaller than or equal to a predetermined amount, executes a second calculation process in which the (Continued)

available travel distance is calculated by subtracting the period travel distance from the previously calculated available travel distance.

10 Claims, 5 Drawing Sheets

(52) U.S. Cl.
CPC ... *B60Y 2400/3019* (2013.01); *F01N 2610/00* (2013.01); *F01N 2610/02* (2013.01); *F01N 2610/1406* (2013.01); *F01N 2610/148* (2013.01); *F01N 2900/1814* (2013.01); *Y02T 10/24* (2013.01)

(58) Field of Classification Search
CPC . B60Y 2400/3019; Y02T 10/24; Y02T 10/47; B06K 37/02
USPC ......... 340/438, 439, 457; 701/101, 103, 108
See application file for complete search history.

(56) References Cited

U.S. PATENT DOCUMENTS

| | | | | |
|---|---|---|---|---|
| 2006/0184307 | A1* | 8/2006 | Kosaka | F01N 3/206 701/110 |
| 2008/0177457 | A1* | 7/2008 | Ishikawa | F02B 23/0669 701/103 |
| 2008/0264044 | A1* | 10/2008 | Kogo | F01N 3/0253 60/295 |
| 2012/0166062 | A1* | 6/2012 | Bald | F01N 3/208 701/102 |

FOREIGN PATENT DOCUMENTS

| | | |
|---|---|---|
| JP | 2006-226204 A | 8/2006 |
| JP | 2008-163919 A | 7/2008 |
| JP | 2009-2859 A | 1/2009 |
| WO | WO 2009/001195 A1 | 12/2008 |

\* cited by examiner

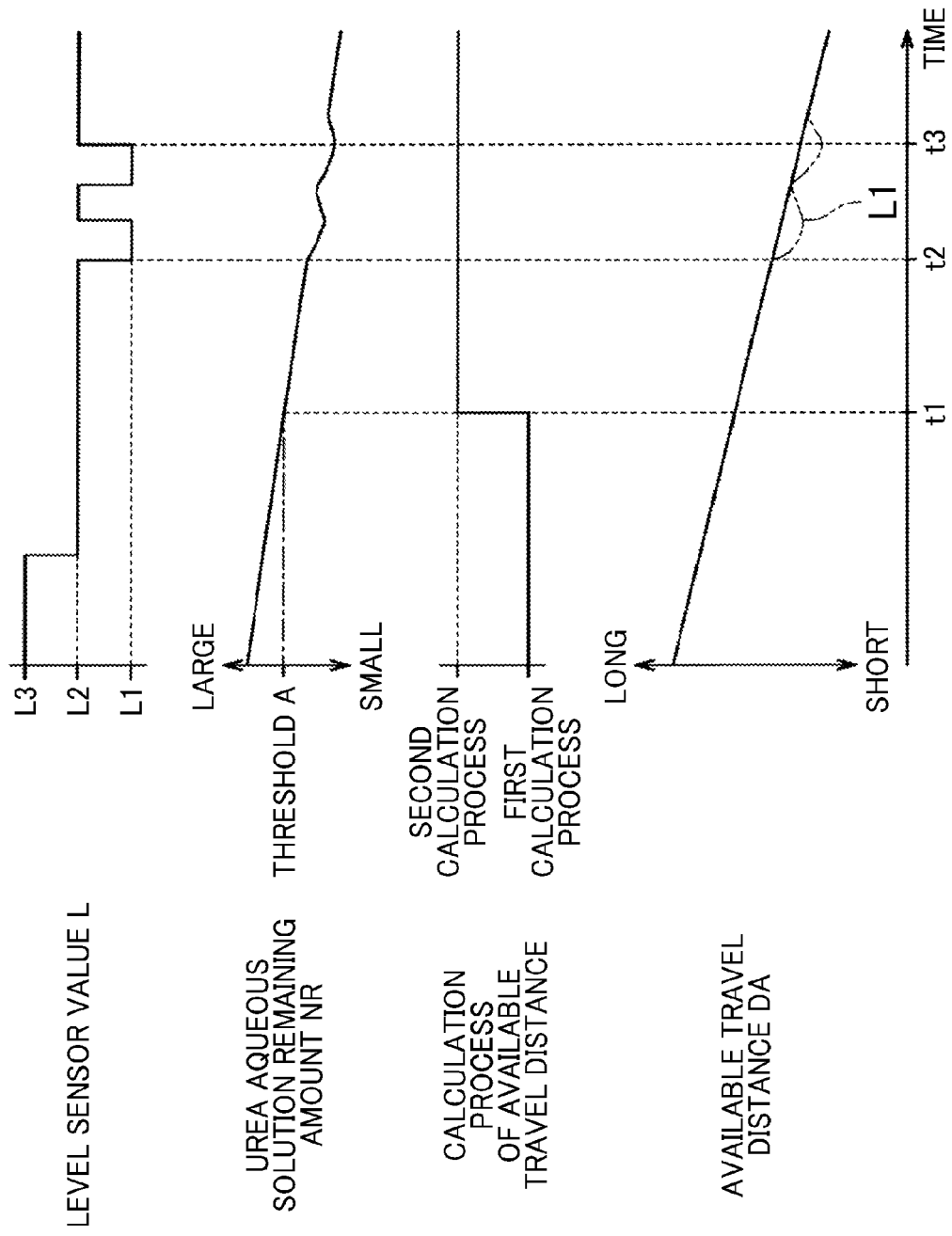

EXHAUST EMISSION CONTROL APPARATUS FOR ON-BOARD INTERNAL COMBUSTION ENGINE, AND METHOD FOR EXHAUST EMISSION CONTROL APPARATUS

INCORPORATION BY REFERENCE

The disclosure of Japanese Patent Application No. 2015-064501) filed on Mar. 26, 2015 including the specification, drawings and abstract is incorporated herein by reference in its entirety.

BACKGROUND OF THE INVENTION

1. Field of the Invention

The invention relates to an exhaust emission control apparatus for an on-board internal combustion engine and a method for the exhaust emission control apparatus.

2. Description of Related Art

There is known an exhaust emission control apparatus that adds additive solution to exhaust gas in order to purify exhaust gas from an on-board internal combustion engine. For example, an apparatus described in Japanese Patent Application Publication No. 2009-002859 (JP 2009-002859 A) adds additive solution, such as urea aqueous solution, to exhaust gas in order to reduce and purify nitrogen oxides (NOx) in exhaust gas with the use of a catalyst.

When the amount of additive solution stored in a tank runs short, it becomes difficult to purify exhaust gas. For this reason, for example, in the apparatus described in JP 2009-002859 A, a liquid surface level that is the height of the liquid surface of additive solution stored in the tank is detected by a level sensor, and the remaining amount of additive solution in the tank is calculated on the basis of the detected liquid surface level. An available travel distance that the vehicle is allowed to travel while purifying exhaust gas by using additive solution is calculated with reference to the calculated remaining amount of additive solution. The calculated available travel distance is indicated on a readout provided in a vehicle cabin. With the thus configured apparatus, the available travel distance that is indicated on the readout reduces as the remaining amount of additive solution reduces. Therefore, it is possible to warn a vehicle driver to add additive solution through such an indication of the available travel distance.

For example, when the vehicle is traveling on a slope or when the vehicle is accelerating or decelerating, the liquid surface of additive solution inside the tank inclines. Therefore, the liquid surface level that is detected by the level sensor changes, with the result that the remaining amount of additive solution that is calculated on the basis of the liquid surface level also changes. As the remaining amount of additive solution changes, the available travel distance that is calculated with reference to the remaining amount of additive solution also changes. Thus, the available travel distance that is indicated on the readout also changes.

For example, as the remaining amount of additive solution changes to increase due to inclination of the liquid surface, the indicated available travel distance increases as compared to the indicated available travel distance before the remaining amount of additive solution changes. Conversely, as the remaining amount of additive solution changes to reduce due to inclination of the liquid surface, the indicated available travel distance reduces as compared to the indicated available travel distance before the remaining amount of additive solution changes.

Therefore, usually, the available travel distance gradually reduces as the vehicle travels. However, when the liquid surface inclines, the available travel distance may increase or the available travel distance may steeply reduce for a distance that the vehicle has actually travelled, and there is a concern that the available travel distance exhibits a change tendency different from the above-described usual change tendency.

The available travel distance calculated at the time when the remaining amount of additive solution is small is shorter than the available travel distance calculated at the time when the remaining amount of additive solution is large. Even when the amount of change in available travel distance due to inclination of the liquid surface is the same, the ratio of the amount of change in available travel distance to the available travel distance before change at the time when the available travel distance before change is short is larger than the ratio at the time when the available travel distance before change is long. For this reason, when the remaining amount of additive solution is small and the available travel distance that is indicated on the readout is short, the vehicle driver more easily feels that the degree of change at the time when the available travel distance has changed is large as compared to when the available travel distance that is indicated on the readout is long.

Therefore, when the remaining amount of additive solution is small, there is a concern that the above-described change tendency of the available travel distance on the readout, different from the usual change tendency, that is, a change in the available travel distance, such as an increase or a steep reduction in available travel distance, makes the vehicle driver experience a feeling of strangeness.

SUMMARY OF THE INVENTION

The invention provides an exhaust emission control apparatus for an on-board internal combustion engine, which is able to, when an available travel distance based on the remaining amount of additive solution is indicated, prevent or reduce the indicated available travel distance from making a vehicle driver experience a feeling of strangeness, and a method for the exhaust emission control apparatus.

An aspect of the invention provides an exhaust emission control apparatus for an on-board internal combustion engine. The exhaust emission control apparatus adds additive solution to exhaust gas from the on-board internal combustion engine in order to purify the exhaust gas. The exhaust emission control apparatus includes a level sensor, a controller and a readout. The level sensor is provided in a tank in which the additive solution is stored. The level sensor is configured to detect a liquid surface level that indicates the height of a liquid surface of the additive solution. The controller is configured to (i) calculate a remaining amount of the additive solution inside the tank on the basis of the liquid surface level detected by the level sensor, (ii) calculate an available travel distance that a vehicle is allowed to travel while purifying exhaust gas by using the additive solution, (iii) store the calculated available travel distance, and (iv) calculate a period travel distance that is a travel distance of the vehicle from when the available travel distance is calculated to when the available travel distance is calculated next. The readout is provided in a vehicle cabin. The readout is configured to indicate the calculated available travel distance. The controller is configured to, when the remaining amount of the additive solution exceeds a predetermined amount, execute a first calculation process in which the available travel distance is calculated with reference to the remaining amount of the additive solution. The controller is configured to, after the remaining amount of the additive solution becomes smaller than or equal to the predetermined amount, execute a second calculation process in which the available travel distance is calculated by subtracting the period travel distance from the stored previously calculated available travel distance.

With this configuration, when the remaining amount of the additive solution reduces to an amount smaller than or equal to the predetermined amount, the process of calculating the available travel distance that the vehicle is allowed to travel while purifying exhaust gas by using the additive solution is switched from the first calculation process in which the remaining amount of the additive solution is referenced to the second calculation process in which the available travel distance is calculated by subtracting the period travel distance from the previously calculated available travel distance.

The process of calculating the available travel distance by reducing the travel distance of the vehicle is executed in this way, so the available travel distance that is indicated on the readout gradually reduces in response to an actual travel distance. Therefore, such an inconvenience that the available travel distance increases or the available travel distance rapidly reduces is prevented or reduced. Therefore, it is possible to prevent or reduce a feeling of strangeness experienced by the vehicle driver due to the available travel distance indicated on the readout.

The travel distance of the vehicle is obtained by multiplying a vehicle speed by a time. In the aspect of the exhaust emission control apparatus, the controller may be configured to acquire a vehicle speed, and the controller may be configured to calculate the period travel distance on the basis of the vehicle speed at the time when the available travel distance is calculated and a calculation time interval of the available travel distance. Thus, it is possible to calculate the period travel distance that is a travel distance of the vehicle from when the available travel distance is calculated to when the available travel distance is calculated next.

In the aspect of the exhaust emission control apparatus, the controller may be configured to indicate the available travel distance on the readout at a point in time at which the available travel distance becomes shorter than or equal to a predetermined value.

With this configuration, the available travel distance is indicated on the readout from the point in time at which the available travel distance becomes shorter than or equal to the predetermined value, so, in comparison with the case where the available travel distance is constantly indicated, it becomes more easy to cause the vehicle driver to find that a warning that prompts refilling of the tank with the additive solution has been issued.

In the aspect of the exhaust emission control apparatus, the predetermined amount may be a remaining amount of the additive solution, at which a warning that prompts refilling of the tank with the additive solution is required. With this configuration, after the remaining amount of the additive solution inside the tank has decreased to an amount at which a warning that prompts refilling of the tank with the additive solution is required, that is, when the remaining amount of the additive solution is small and, as a result, the ratio of the amount of change in the available travel distance increases, the second calculation process in which the available travel distance is calculated by subtracting the above-described period travel distance is allowed to be executed.

In the aspect of the exhaust emission control apparatus, the controller may be configured to execute a process of calculating the available travel distance by multiplying an additive solution consumption rate by the remaining amount of the additive solution as the first calculation process, and the additive solution consumption rate may indicate the ratio of a vehicle travel distance to a consumption of the additive solution.

The additive solution consumption rate is a value indicating the ratio of a vehicle travel distance to a consumption of the additive solution as described above. More specifically, where the vehicle travel distance (km) is B and the amount (L) of the additive solution consumed in a period in which the vehicle has travelled a distance of B is A, the additive solution consumption rate is a value obtained from B/A (km/L).

With this configuration, when the remaining amount of the additive solution exceeds the predetermined amount, the available travel distance is calculated with reference to the remaining amount of the additive solution on the basis of the remaining amount of the additive solution and the consumption of the additive solution, so it is possible to appropriately calculate the available travel distance commensurate with the remaining amount of the additive solution.

Another aspect of the invention provides a method for an exhaust emission control apparatus. The exhaust emission control apparatus adds additive solution to exhaust gas from an on-board internal combustion engine in order to purify the exhaust gas. The exhaust emission control apparatus includes a level sensor and a readout. The level sensor is provided in a tank in which the additive solution is stored. The level sensor is configured to detect a liquid surface level that indicates the height of a liquid surface of the additive solution. The readout is provided inside a vehicle cabin. The readout is configured to indicate an available travel distance. The method includes calculating a remaining amount of the additive solution inside the tank on the basis of the liquid surface level detected by the level sensor; calculating an available travel distance that a vehicle is allowed to travel while purifying exhaust gas by using the additive solution; storing the calculated available travel distance; calculating a period travel distance that is a travel distance of the vehicle from when the available travel distance is calculated to when the available travel distance is calculated next; indicating the calculated available travel distance; when the remaining amount of the additive solution exceeds a predetermined amount, executing a first calculation process in which the available travel distance is calculated with reference to the remaining amount of the additive solution; and, after the remaining amount of the additive solution becomes smaller than or equal to the predetermined amount, executing a second calculation process in which the available travel distance is calculated by subtracting the period travel distance from the stored previously calculated available travel distance.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 5 is a timing chart that shows the operation of a mode of calculating an available travel distance in the embodiment.

DETAILED DESCRIPTION OF EMBODIMENTS

Hereinafter, an example embodiment of an exhaust emission control apparatus for an on-board internal combustion engine will be described with reference to FIG. 1 to FIG. 5. The internal combustion engine in the present embodiment is a diesel engine, and hereinafter simply referred to as engine.

Figure 1:
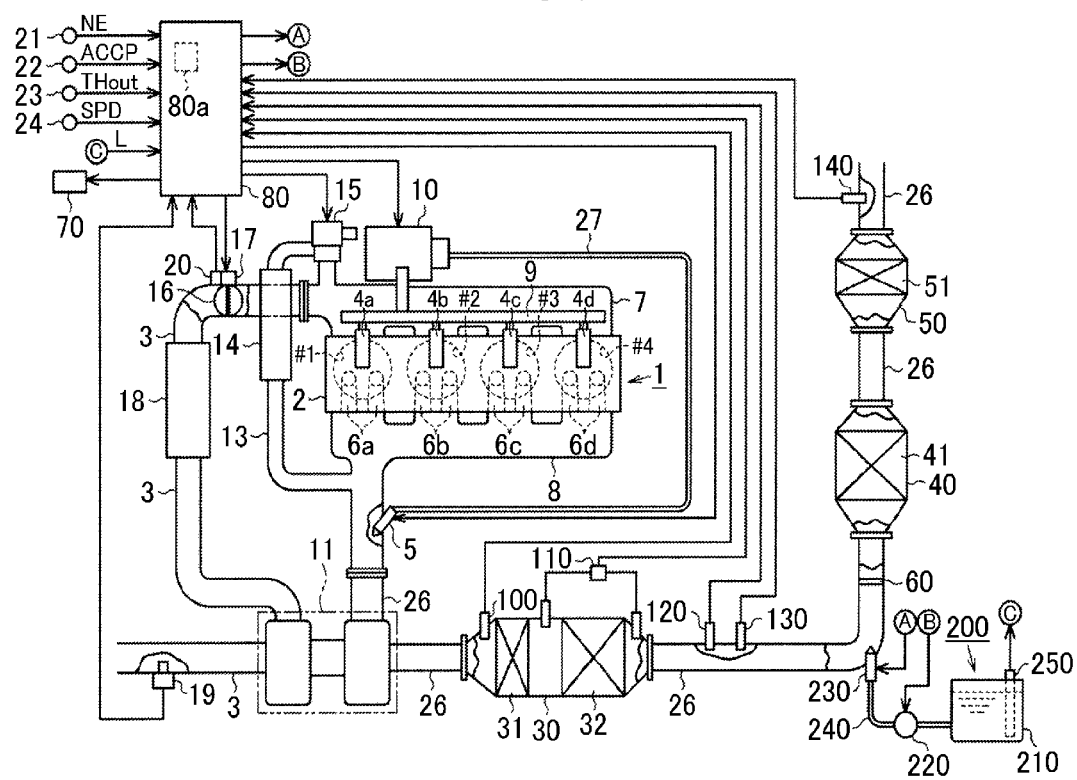
FIG. 1 is a schematic view that shows the configuration of an internal combustion engine to which an exhaust emission control apparatus for an on-board internal combustion engine according to an embodiment of the invention is applied.

As shown in FIG. 1, the engine 1 includes a plurality of cylinders #1 to #4. A plurality of fuel injection valves 4a to 4d are installed in a cylinder head 2. Each of these fuel injection valves 4a to 4d injects fuel into a combustion chamber of a corresponding one of the cylinders #1 to #4. The cylinder head 2 includes intake ports and exhaust ports 6a to 6d in correspondence with the cylinders #1 to #4. The intake ports are used to introduce fresh air into the cylinders. The exhaust ports 6a to 6d are used to emit combustion gas to the outside of the cylinders.

The fuel injection valves 4a to 4d are connected to a common rail 9. The common rail 9 accumulates high-pressure fuel. The common rail 9 is connected to a supply pump 10. The supply pump 10 draws fuel inside a fuel tank, and supplies high-pressure fuel to the common rail 9. High-pressure fuel supplied to the common rail 9 is injected from the fuel injection valves 4a to 4d into the corresponding cylinders when the fuel injection valves 4a to 4d are opened.

An intake manifold 7 is connected to the intake ports. The intake manifold 7 is connected to an intake passage 3. An intake throttle valve 16 is provided in the intake passage 3. The intake throttle valve 16 is used to adjust an intake air amount.

An exhaust manifold 8 is connected to the exhaust ports 6a to 6d. The exhaust manifold 8 is connected to an exhaust passage 26. A turbocharger 11 is provided halfway in the exhaust passage 26. The turbocharger 11 supercharges intake air, which is introduced into the cylinders, by utilizing exhaust gas pressure. An intercooler 18 is provided in the intake passage 3 between an intake-side compressor of the turbocharger 11 and the intake throttle valve 16. Intake air of which the temperature has risen as a result of supercharging of the turbocharger 11 is cooled by the intercooler 18.

A first purification member 30 is provided halfway in the exhaust passage 26 downstream of an exhaust-side turbine of the turbocharger 11. The first purification member 30 purifies exhaust gas. An oxidation catalyst 31 and a DPF (diesel particulate filter) catalyst 32 are arranged inside the first purification member 30 in series with respect to a direction in which exhaust gas flows.

Catalysts that oxidize HC (hydrocarbon) in exhaust gas are supported on the oxidation catalyst 31. The DPF catalyst 32 is a filter that traps particulate matter (PM) in exhaust gas, and is made of porous ceramics. In addition, catalysts for facilitating oxidation of PM are supported on the DPF catalyst 32. PM in exhaust gas is trapped at the time when the PM passes through the porous wall of the DPF catalyst 32.

A fuel addition valve 5 is provided near the collecting portion of the exhaust manifold 8. The fuel addition valve 5 is used to supply fuel as additive agent to the oxidation catalyst 31 or the DPF catalyst 32. The fuel addition valve 5 is connected to the supply pump 10 via a fuel supply pipe 27. The arrangement position of the fuel addition valve 5 may be changed as needed as long as the arrangement position is in an exhaust system upstream of the first purification member 30.

A second purification member 40 is provided halfway in the exhaust passage 26 downstream of the first purification member 30. The second purification member 40 purifies exhaust gas. A NOx selective catalytic reduction catalyst (hereinafter, referred to as SCR catalyst) 41 is arranged inside the second purification member 40. The SCR catalyst 41 serves as an exhaust gas purification catalyst that reduces and purifies NOx in exhaust gas by utilizing additive solution.

A third purification member 50 is provided halfway in the exhaust passage 26 downstream of the second purification member 40. The third purification member 50 purifies exhaust gas. An ammonia oxidation catalyst 51 is arranged inside the third purification member 50. The ammonia oxidation catalyst 51 purifies ammonia in exhaust gas.

The engine 1 includes a urea aqueous solution supply mechanism 200. The urea aqueous solution supply mechanism 200 supplies the SCR catalyst 41 with urea aqueous solution as the additive solution. The urea aqueous solution supply mechanism 200 includes a tank 210, a urea addition valve 230, a supply passage 240, a pump 220, a level sensor 250, and the like. The tank 210 stores urea aqueous solution. The urea addition valve 230 injects and adds urea aqueous solution into the exhaust passage 26. The supply passage 240 connects the urea addition valve 230 with the tank 210. The pump 220 is provided halfway in the supply passage 240. The level sensor 250 detects a liquid surface level that indicates the height of the liquid surface of urea aqueous solution stored in the tank 210. A sensor value of the level sensor 250 is hereinafter referred to as level sensor value L. The remaining amount of urea aqueous solution inside the tank 210 is calculated on the basis of the level sensor value L. A sensor that is able to detect a change in liquid level in a stepwise manner is employed as the level sensor 250 according to the present embodiment. The sensor may be replaced with a sensor that is able to detect a change in liquid surface level continuously.

The urea addition valve 230 is provided in the exhaust passage 26 between the first purification member 30 and the second purification member 40. The injection hole of the urea addition valve 230 is open toward the SCR catalyst 41. As the urea addition valve 230 is opened, urea aqueous solution is injected and supplied into the exhaust passage 26 via the supply passage 240.

The pump 220 is an electric pump. When the pump 220 rotates in a forward direction, the pump 220 feeds urea aqueous solution from the tank 210 toward the urea addition valve 230. On the other hand, when the pump 220 rotates in a reverse direction, the pump 220 feeds urea aqueous solution from the urea addition valve 230 toward the tank 210. That is, when the pump 220 rotates in the reverse direction, urea aqueous solution is recovered from the urea addition valve 230 and the supply passage 240 and is returned to the tank 210.

A diffusion plate 60 is provided in the exhaust passage 26 between the urea addition valve 230 and the SCR catalyst 41. The diffusion plate 60 diffuses urea aqueous solution injected from the urea addition valve 230 to thereby atomize the urea aqueous solution.

Urea aqueous solution injected from the urea addition valve 230 changes into ammonia by hydrolysis utilizing exhaust heat. This ammonia is adsorbed onto the SCR catalyst 41. NOx is reduced and purified by ammonia adsorbed on the SCR catalyst 41.

Other than the above, the engine 1 includes an exhaust gas recirculation device (hereinafter, referred to as EGR device). The EGR device is a device that decreases combustion temperature inside the cylinders by introducing part of exhaust gas into intake air to thereby reduce the amount of emission of NOx. The EGR device includes an EGR passage 13, an EGR valve 15, an EGR cooler 14, and the like. The EGR passage 13 communicates the intake passage 3 with the exhaust manifold 8. The EGR valve 15 is provided in the EGR passage 13. A recirculation amount of exhaust gas that is introduced from the exhaust passage 26 into the intake passage 3, that is, a so-called external EGR amount, is adjusted by adjusting the opening degree of the EGR valve 15. The temperature of exhaust gas flowing through the EGR passage 13 is decreased by the EGR cooler 14.

Various sensors and switches are installed in the engine 1. The various sensors and switches are used to detect an engine operating state. For example, an air flow meter 19 detects an intake air amount GA in the intake passage 3. A throttle valve opening degree sensor 20 detects the opening degree of the intake throttle valve 16. A crank angle sensor 21 detects the rotation speed of a crankshaft, that is, an engine rotation speed NE. An accelerator operation amount sensor 22 detects the depression amount of an accelerator pedal, that is, an accelerator operation amount ACCP. An outside air temperature sensor 23 detects an outside air temperature THout. A vehicle speed sensor 24 detects a vehicle speed SPD. The vehicle speed SPD is the travel speed of a vehicle on which the engine 1 is mounted.

A first exhaust gas temperature sensor 100 is provided upstream of the oxidation catalyst 31, and detects a first exhaust gas temperature TH1. The first exhaust gas temperature TH1 is an exhaust gas temperature before exhaust gas flows into the oxidation catalyst 31. A differential pressure sensor 110 detects a pressure difference $\Delta P$ between an exhaust gas pressure upstream of the DPF catalyst 32 and an exhaust gas pressure downstream of the DPF catalyst 32.

A second exhaust gas temperature sensor 120 and a first NOx sensor 130 are provided in the exhaust passage 26 between the first purification member 30 and the second purification member 40 and are provided upstream of the urea addition valve 230. The second exhaust gas temperature sensor 120 detects a second exhaust gas temperature TH2. The second exhaust gas temperature TH2 is an exhaust gas temperature before exhaust gas flows into the SCR catalyst 41. The first NOx sensor 130 detects a first NOx concentration N1. The first NOx concentration N1 is the concentration of NOx in exhaust gas before exhaust gas flows into the SCR catalyst 41.

A second NOx sensor 140 is provided in the exhaust passage 26 downstream of the third purification member 50. The second NOx sensor 14 detects a second NOx concentration N2. The second NOx concentration N2 is the concentration of NOx in exhaust gas that has passed through the SCR catalyst 41.

Outputs of these various sensors, and the like, are input to a controller 80. The controller 80 includes a central processing unit (CPU), a read only memory (ROM), a random access memory (RAM), a nonvolatile memory 80a (for example, EEPROM, or the like), various interfaces, and the like. The ROM prestores various programs, maps, and the like. The RAM temporarily stores computed results, and the like, of the CPU. The nonvolatile memory 80a is able to electrically rewrite stored numeric values.

The controller 80 executes various controls over the engine 1, for example, fuel injection amount control and fuel injection timing control over the fuel injection valves 4a to 4d and the fuel addition valve 5, discharge pressure control over the supply pump 10, driving amount control over an actuator 17 that opens or closes the intake throttle valve 16, opening degree control over the EGR valve 15, and the like.

The controller 80 executes control for adding urea aqueous solution by using the urea addition valve 230 as one exhaust gas purification control. In this addition control, a target addition amount QE is calculated on the basis of the engine operating state, and the like. The target addition amount QE is a target value of a urea addition amount that is required to reduce NOx emitted from the engine 1. The valve open state of the urea addition valve 230 is controlled such that urea aqueous solution in an amount corresponding to the target addition amount QE is injected from the urea addition valve 230.

The controller 80 calculates an available travel distance with reference to the remaining amount of urea aqueous solution. The available travel distance is such a distance that the vehicle is allowed to travel while purifying exhaust gas by using urea aqueous solution. In other words, the available travel distance is such a distance that the vehicle is allowed to travel by using the current remaining amount of urea aqueous solution. The controller 80 provides notification pertaining to the remaining amount of urea aqueous solution by informing a vehicle driver of a calculated available travel distance. In other words, the controller 80 provides notification that prompts refilling of the tank 210 with urea aqueous solution.

This notification to the vehicle driver is provided by using a readout 70 connected to the controller 80. The readout 70 is provided in, for example, a meter panel in a vehicle cabin. The readout 70 indicates the available travel distance upon reception of a command from the controller 80. Examples of a method of indicating the available travel distance include indicating the available travel distance by numeric value and indicating the available travel distance by bar graph, or the like.

Figure 2:
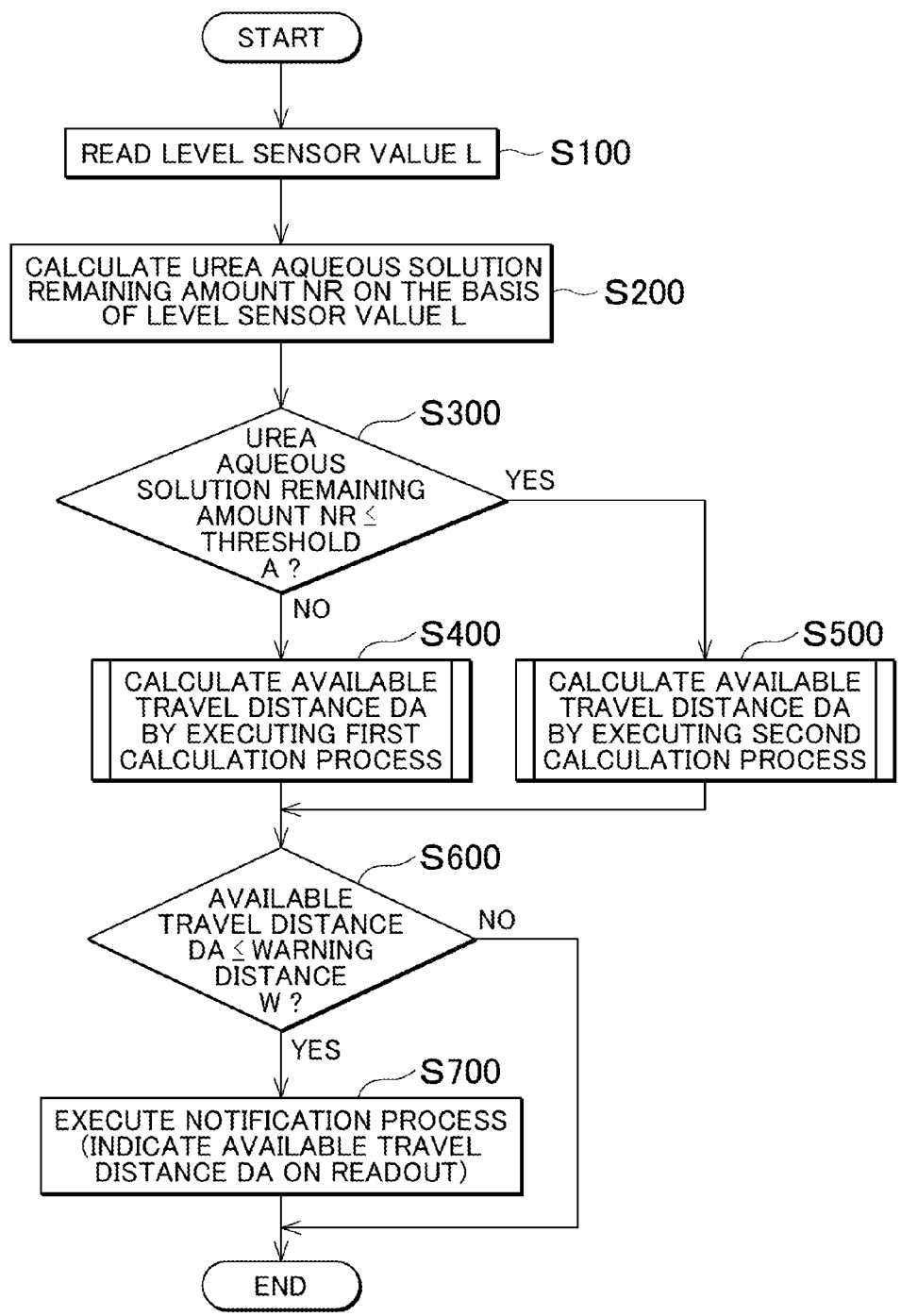
FIG. 2 is a flowchart that shows a procedure for calculating an available travel distance in the embodiment.

Hereinafter, the process of calculating the above-described available travel distance and providing notification pertaining to the remaining amount of urea aqueous solution will be described. This process is executed by the controller 80 at intervals of a predetermined execution period EP. As shown in FIG. 2, as the process is started, initially, the current level sensor value L is read (S100).

Subsequently, a urea aqueous solution remaining amount NR is calculated on the basis of the read level sensor value L (S200). The urea aqueous solution remaining amount NR is the remaining amount of urea aqueous solution inside the tank 210. The process of calculating the urea aqueous solution remaining amount NR may be executed as needed.

For example, the current urea aqueous solution remaining amount NR is calculated by subtracting an integrated value of the target addition amount QE, starting from a change in the level sensor value L, from the urea aqueous solution remaining amount corresponding to the level sensor value L. That is, the integrated value of the target addition amount QE is an amount corresponding to the amount of consumed urea aqueous solution from a change in the level sensor value L. Other than the above, when the level sensor 250 is a sensor that is able to detect a change in the liquid surface level continuously, the urea aqueous solution remaining amount NR is allowed to be calculated by multiplying the level sensor value L by a predetermined coefficient, reading the urea aqueous solution remaining amount NR from a map having the level sensor value L as an argument, or the like.

Subsequently, it is determined whether the calculated urea aqueous solution remaining amount NR is smaller than or equal to a predetermined threshold A (S300). The remaining amount of urea aqueous solution to an extent such that a warning that prompts refilling of the tank 210 with urea aqueous solution is required is set for the threshold A.

When the urea aqueous solution remaining amount NR exceeds the threshold A (NO in S300), an available travel distance DA is calculated by executing a first calculation process (S400). In this first calculation process, the available travel distance DA is calculated with reference to the urea aqueous solution remaining amount NR.

Figure 3:
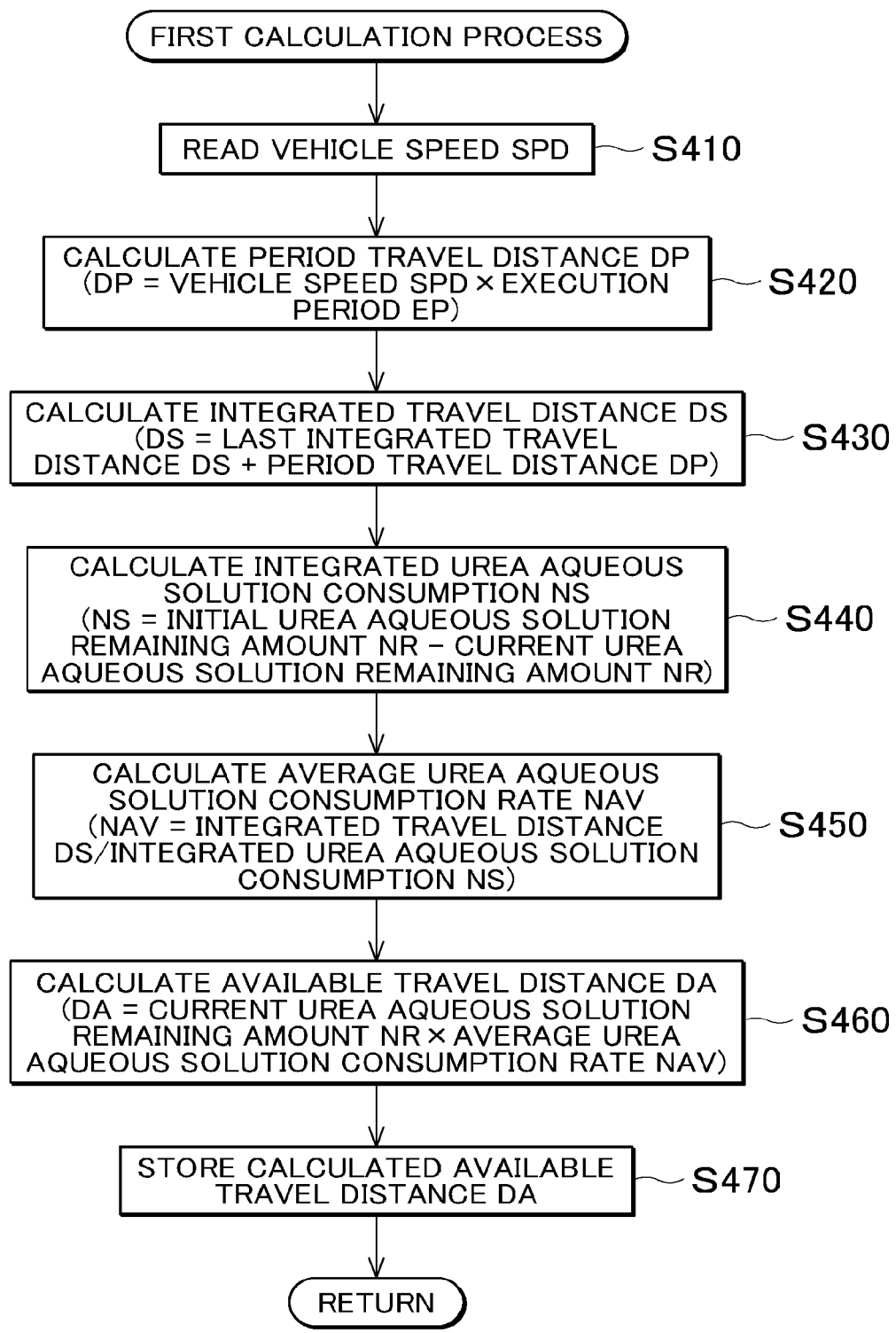
FIG. 3 is a flowchart that shows the procedure of a first calculation process in which an available travel distance is calculated in the embodiment.

As shown in FIG. 3, as the first calculation process is executed, the vehicle speed SPD is initially read (S410). Subsequently, a period travel distance DP is calculated (S420). The period travel distance DP is a distance that the vehicle has travelled in a period from when the available travel distance DA is calculated to when the available travel distance DA is calculated next, that is, a period of a calculation time interval of the available travel distance DA. The calculation time interval is a time that coincides with a time of the execution period EP of a series of processes shown in FIG. 2.

In step S420, the period travel distance DP is calculated by multiplying the execution period EP by the vehicle speed SPD at the time when the available travel distance DA is calculated in the current execution period, that is, the vehicle speed SPD read in step S410.

Subsequently, an integrated travel distance DS is calculated (S430). The integrated travel distance DS is a value obtained by integrating the period travel distance DP. The integrated travel distance DS in the current calculation period is calculated by adding the period travel distance DP calculated in step S420 to the last integrated travel distance DS (that is, the integrated travel distance DS calculated in the last calculation period). The integrated travel distance DS is reset to zero when the tank 210 is refilled with urea aqueous solution.

Subsequently, an integrated urea aqueous solution consumption NS is calculated (S440). The integrated urea aqueous solution consumption NS is the total amount of urea aqueous solution consumed from when calculation of the integrated travel distance DS is started to the present time. The integrated urea aqueous solution consumption NS in the current calculation period is calculated by subtracting the current urea aqueous solution remaining amount NR (=the urea aqueous solution remaining amount NR calculated in step S200) from the initial urea aqueous solution remaining amount NR, that is, the urea aqueous solution remaining amount NR at the time when calculation of the integrated travel distance DS is started. For information, the above-described initial urea aqueous solution remaining amount NR is usually the same as the urea aqueous solution remaining amount NR just after the tank 210 is filled with urea aqueous solution.

Subsequently, an average urea aqueous solution consumption rate NAV is calculated (S450). The average urea aqueous solution consumption rate NAV is a urea aqueous solution consumption rate that indicates the ratio of a vehicle travel distance to the consumption of urea aqueous solution, and is calculated by dividing the integrated travel distance DS (in Km) by the integrated urea aqueous solution consumption NS (in L) (NAV=DS/NS). That is, the average urea aqueous solution consumption rate NAV is a value that indicates an available travel distance that the vehicle is allowed to travel by using a liter of urea aqueous solution.

Subsequently, the available travel distance DA that the vehicle is allowed to travel by using the current remaining amount of urea aqueous solution is calculated by multiplying the current urea aqueous solution remaining amount NR by the average urea aqueous solution consumption rate NAV (S460). Subsequently, the calculated available travel distance DA is stored in a nonvolatile memory 80*a* that constitutes a storage unit (S470). When the available travel distance DA is stored in step S470, the last available travel distance DA that has been stored in the nonvolatile memory 80*a* is erased, and only the currently calculated latest available travel distance DA is held. The first calculation process is ended, and the process from step S600 shown in FIG. 2 is continuously executed.

On the other hand, when it is determined in step S300 shown in FIG. 2 that the urea aqueous solution remaining amount NR is smaller than or equal to the threshold A (YES in S300 of FIG. 2), the available travel distance DA is calculated by executing a second calculation process (S500). In this second calculation process, instead of calculating the available travel distance DA with reference to the urea aqueous solution remaining amount NR, the current available travel distance DA is calculated by subtracting the period travel distance DP from the previously calculated available travel distance DA.

Figure 4:
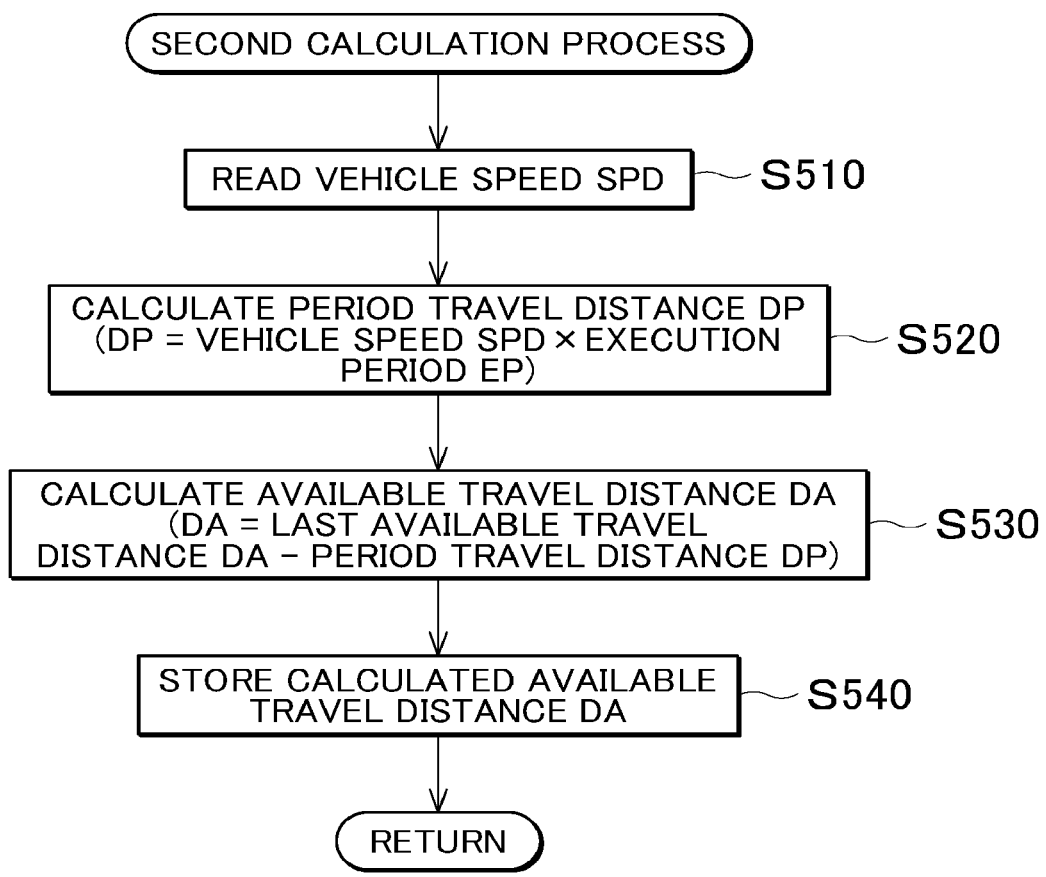
FIG. 4 is a flowchart that shows the procedure of a second calculation process in which an available travel distance is calculated in the embodiment.

As shown in FIG. 4, as the second calculation process is executed, the vehicle speed SPD is initially read (S510). Subsequently, the above-described period travel distance DP is calculated (S520). The period travel distance DP is a distance that the vehicle has travelled in a period from when the available travel distance DA is calculated to when the available travel distance DA is calculated next, that is, a period of the calculation time interval of the available travel distance DA. The calculation time interval in this case also coincides with a time of the execution period EP of the series of processes shown in FIG. 2.

In this step S520, as well as step S420, the period travel distance DP is calculated by multiplying the execution period EP by the vehicle speed SPD at the time when the available travel distance DA is calculated in the current execution period, that is, the vehicle speed SPD read in step S510.

Subsequently, the available travel distance DA is calculated (S530). In step S530, the available travel distance DA in the current calculation period is calculated by subtracting the period travel distance DP calculated in step S520 from the last available travel distance DA (that is, the available travel distance DA calculated in the last calculation period and stored in the nonvolatile memory 80*a*). The last available travel distance DA at the time when step S530 is executed for the first time is the available travel distance DA calculated in the first calculation process just before the urea aqueous solution remaining amount NR becomes smaller than or equal to the threshold A, that is, the final available travel distance DA calculated in the first calculation process. Therefore, as a result of a repetition of the second calculation process, the available travel distance DA that is calculated in the second calculation process gradually becomes shorter from the final available travel distance DA calculated in the first calculation process in units of the period travel distance DP.

Subsequently, the calculated available travel distance DA is stored in the nonvolatile memory 80a that constitutes the storage unit (S540). In step S540 as well, when the available travel distance DA is stored, the last available travel distance DA that has been stored in the nonvolatile memory 80a is erased, and only the currently calculated latest available travel distance DA is held. The second calculation process is ended, and the process from step S600 shown in FIG. 2 is continuously executed.

As the available travel distance DA is calculated in step S400 or step S500, it is determined whether the calculated available travel distance DA is shorter than or equal to a warning distance W (S600). The warning distance W is set in advance to a value by which the situation that the available travel distance DA has shortened to such an extent that the vehicle driver should be provided with notification pertaining to the remaining amount of urea aqueous solution is determined on the basis of the fact that the available travel distance DA is shorter than or equal to the warning distance W.

When the available travel distance DA is longer than the warning distance W (NO in S600), the process is ended. On the other hand, when the available travel distance DA is shorter than or equal to the warning distance W (YES in S600), a notification process of providing notification to the vehicle driver, or the like, is executed (S700). As the notification process is executed, the current available travel distance DA is indicated on the readout 70. More specifically, the available travel distance DA that has not been indicated till then is indicated by executing the notification process. A warning that prompts refilling of the tank 210 with urea aqueous solution is issued by an indication of the available travel distance DA on the readout 70.

The process is then ended. The controller 80 that executes the above-described series of processes functions as a remaining amount calculation unit, an available travel distance calculation unit and a period travel distance calculation unit. The remaining amount calculation unit calculates the remaining amount of urea aqueous solution. The available travel distance calculation unit calculates the available travel distance that the vehicle is allowed to travel while purifying exhaust gas by using urea aqueous solution. The period travel distance calculation unit calculates the period travel distance that is a travel distance of the vehicle from when the available travel distance is calculated to when the available travel distance is calculated next. The controller 80 that executes the above-described series of processes also functions as an acquisition unit and an indication determination unit. The acquisition unit acquires a vehicle speed. The indication determination unit indicates the available travel distance on the readout from the point in time at which the available travel distance becomes shorter than or equal to the predetermined value.

Next, the operation of the above-described series of processes will be described. As shown in FIG. 5, as urea aqueous solution inside the tank 210 reduces as a result of injection of urea aqueous solution into the exhaust passage 26, the liquid surface level decreases, with the result that the level sensor value L changes in a stepwise manner. The urea aqueous solution remaining amount NR that is calculated on the basis of the level sensor value L gradually reduces.

While the urea aqueous solution remaining amount NR exceeds the threshold A, the available travel distance DA is calculated by using the above-described first calculation process. In this first calculation process, as shown in step S460, and the like, the available travel distance DA is calculated with reference to the urea aqueous solution remaining amount NR, so the available travel distance DA also becomes shorter with a reduction in the urea aqueous solution remaining amount NR.

Incidentally, if the available travel distance DA is calculated by the first calculation process when the urea aqueous solution remaining amount NR is smaller than the threshold A (from time t1 shown in FIG. 5), there is a concern about the following inconvenience.

That is, when the vehicle travels on a slope or accelerates or decelerates, the liquid surface of urea aqueous solution inside the tank 210 inclines. Therefore, the liquid surface level that is detected by the level sensor 250 changes, with the result that the level sensor value L changes (from time t2 to time t3 shown in FIG. 5). As the level sensor value L changes, the urea aqueous solution remaining amount NR that is calculated on the basis of the level sensor value L also changes. As the urea aqueous solution remaining amount NR changes in this way, the available travel distance DA is calculated with reference to the urea aqueous solution remaining amount NR in the first calculation process. Therefore, as indicated by the alternate long and two-short dashes line L1, the available travel distance DA to be calculated also changes, with the result that the available travel distance DA that is indicated on the readout 70 also changes.

For example, as the urea aqueous solution remaining amount NR increases as a result of inclination of the liquid surface, the indicated available travel distance DA increases as compared to the available travel distance DA before a change in the urea aqueous solution remaining amount NR. On the other hand, as the urea aqueous solution remaining amount NR reduces as a result of inclination of the liquid surface, the indicated available travel distance DA reduces as compared to the available travel distance DA before a change in the urea aqueous solution remaining amount NR.

Therefore, usually, the available travel distance DA gradually becomes shorter as the vehicle travels, however, when the liquid surface inclines, the available travel distance DA may increase or the available travel distance DA may steeply reduce for a distance that the vehicle has actually travelled, and there is a concern that the available travel distance DA exhibits a change tendency different from the above-described usual change tendency.

The available travel distance DA calculated at the time when the urea aqueous solution remaining amount NR is small is shorter than the available travel distance DA calculated at the time when the urea aqueous solution remaining amount NR is large. Even when the amount of change in the available travel distance DA due to inclination of the liquid surface is the same, the ratio of the amount of change in the available travel distance DA to the available travel distance DA before change at the time when the available travel distance DA before change is short is larger than the ratio at the time when the available travel distance DA before change is long. For example, when the amount of change in the available travel distance DA due to inclination of the liquid surface is 1 and the available travel distance DA before change is 100, the ratio of the amount of change in the available travel distance DA to the available travel distance DA before change is 1/100×100=1%. On the other hand, when the available travel distance DA before change is 10, the ratio of the amount of change in the available travel distance DA to the available travel distance DA before change is 1/10×100=10%. Numeric values, that is, the above-described "1", "10" and "100", are relative values used to illustrate differences in magnitude among the numeric values for the sake of convenience, and are different from values that directly indicate actual distances.

In this way, when the remaining amount of urea aqueous solution is small and the available travel distance DA indicated on the readout 70 is short, the ratio of the amount of change in the available travel distance DA to the available travel distance DA before change increases as compared to when the available travel distance DA indicated on the readout 70 is long. Therefore, the vehicle driver more easily feels that the degree of change is large when the available travel distance DA has changed.

Therefore, when the remaining amount of urea aqueous solution is small, there is a concern that the change tendency of the available travel distance DA on the readout 70, different from the usual change tendency, that is, a change in the available travel distance DA, such as an increase or a steep reduction in the available travel distance DA, makes the vehicle driver experience a feeling of strangeness.

In this respect, in the present embodiment, when the urea aqueous solution remaining amount NR becomes smaller than or equal to the threshold A (time t1), the process of calculating the available travel distance DA is switched from the first calculation process to the second calculation process. Thus, after the urea aqueous solution remaining amount NR becomes smaller than or equal to the threshold A, the available travel distance DA is calculated by subtracting the above-described period travel distance DP from the previously calculated available travel distance DA.

Therefore, in calculating the available travel distance DA after the urea aqueous solution remaining amount NR becomes smaller than or equal to the threshold A, the urea aqueous solution remaining amount NR is not referenced, and the available travel distance DA gradually reduces by a distance that the vehicle has actually travelled. For this reason, the available travel distance DA that is indicated on the readout 70 gradually reduces with an actual travel distance as indicated by the continuous line in FIG. 5.

By executing the thus configured second calculation process, such an inconvenience that the available travel distance DA increases or the available travel distance DA steeply reduces is prevented or reduced. Therefore, it is possible to prevent or reduce a feeling of strangeness experienced by the vehicle driver due to the available travel distance DA indicated on the readout 70.

As described above, according to the present embodiment, the following advantageous effects are obtained.

(1) When the urea aqueous solution remaining amount NR exceeds the threshold A, the first calculation process in which the available travel distance DA is calculated with reference to the urea aqueous solution remaining amount NR is executed. After the urea aqueous solution remaining amount NR becomes smaller than or equal to the threshold A, the second calculation process in which the available travel distance DA is calculated by subtracting the period travel distance DP from the previously calculated available travel distance DA is executed. Therefore, it is possible to prevent or reduce a feeling of strangeness experienced by the vehicle driver due to the available travel distance DA indicated on the readout 70.

(2) The travel distance of the vehicle is allowed to be obtained by multiplying a vehicle speed by a time. The period travel distance DP is calculated on the basis of the vehicle speed SPD at the time when the available travel distance DA is calculated and the calculation time interval (execution period EP) of the available travel distance DA. Therefore, it is possible to actually calculate the period travel distance DP that is the travel distance of the vehicle from when the available travel distance DA is calculated to when the available travel distance DA is calculated next.

(3) The available travel distance DA is indicated on the readout 70 from the point in time at which the available travel distance DA becomes shorter than or equal to the warning distance W. Therefore, in comparison with the case where the available travel distance DA is constantly indicated on the readout 70, it becomes more easy to cause the vehicle driver to find that a warning that prompts refilling of the tank 210 with urea aqueous solution has been issued.

(4) The threshold A is set to the remaining amount of urea aqueous solution at which a warning that prompts refilling of the tank 210 with urea aqueous solution is required. Therefore, after the remaining amount of urea aqueous solution inside the tank 210 has been decreased to an amount at which a warning that prompts refilling of the tank 210 with urea aqueous solution is required, that is, when the remaining amount of urea aqueous solution is small and when the ratio of the amount of change in the available travel distance DA increases, the second calculation process in which the available travel distance DA is calculated by subtracting the period travel distance DP is executed.

(5) As the first calculation process, the process of calculating the available travel distance DA by multiplying the urea aqueous solution remaining amount NR by the average urea aqueous solution consumption rate NAV that indicates the ratio of the vehicle travel distance to the consumption of urea aqueous solution. Therefore, when the urea aqueous solution remaining amount NR exceeds the threshold A, the available travel distance DA is calculated by referencing the urea aqueous solution remaining amount NR on the basis of the urea aqueous solution remaining amount NR and the average urea aqueous solution consumption rate NAV, so it is possible to appropriately calculate the available travel distance DA based on the urea aqueous solution remaining amount NR.

The above-described embodiment may be modified as follows. In the first calculation process, the average urea aqueous solution consumption rate NAV that is calculated on the basis of the integrated travel distance DS and the integrated urea aqueous solution consumption NS is used as a value that indicates the available travel distance that the vehicle is allowed to travel by a liter of urea aqueous solution, that is, the urea aqueous solution consumption rate that indicates the ratio of the vehicle travel distance to the consumption of urea aqueous solution. Instead, another value may be used as such a urea aqueous solution consumption rate.

For example, a predetermined upper limit value NMAX (in L/h) of urea additive amount is regarded as a value corresponding to the maximum consumption of urea aqueous solution while the vehicle is traveling. An average vehicle speed SPDAV (in km/h) that is an average of the vehicle speed SPD is calculated, and the urea aqueous solution consumption rate is calculated by dividing the average vehicle speed SPDAV by the upper limit value NMAX (urea aqueous solution consumption rate=SPDAV/NMAX). The available travel distance DA that the vehicle is allowed to travel by using the current remaining amount of urea aqueous solution may be calculated by multiplying the urea aqueous solution consumption rate by the current urea aqueous solution remaining amount NR.

A typical urea aqueous solution consumption rate may be obtained in advance on the basis of the consumption of urea aqueous solution, or the like, in various driving patterns of the vehicle, and the available travel distance DA that the vehicle is allowed to travel by using the current remaining amount of urea aqueous solution may be calculated by multiplying the typical urea aqueous solution consumption rate by the current urea aqueous solution remaining amount NR.

The threshold A is set to the remaining amount of urea aqueous solution at which a warning that prompts refilling of the tank 210 with urea aqueous solution is required; however, the threshold A may be set to another value. That is, the threshold A is desirably set to a value by which the remaining amount of urea aqueous solution is small and, as a result, it is allowed to be determined that the ratio of the amount of change in the available travel distance DA is large to such an extent that the vehicle driver experiences a feeling of strangeness.

The period travel distance DP is calculated on the basis of the vehicle speed SPD at the time when the available travel distance DA is calculated and the calculation time interval (execution period EP) of the available travel distance DA. Instead, in an alternative embodiment, the period travel distance DP that is a travel distance of the vehicle from when the available travel distance DA is calculated to when the available travel distance DA is calculated next may be calculated. For example, the period travel distance DP may be calculated on the basis of the number of rotations of each wheel in the period from when the available travel distance DA is calculated to when the available travel distance DA is calculated next.

The available travel distance DA is indicated on the readout 70 from the point in time at which the available travel distance DA becomes shorter than or equal to the warning distance W. Other than the above, the available travel distance DA may be constantly indicated on the readout 70 irrespective of whether the available travel distance DA is long or short. In the case of this alternative embodiment, for example the following notification may be provided as the notification process that is executed at the time when the available travel distance DA becomes shorter than or equal to the warning distance W. That is, notification may be provided by emitting sound, lighting or blinking light, blinking the available travel distance DA indicated on the readout 70, or changing the indication color of the available travel distance DA to the vehicle driver, or the like.

The remaining amount of urea aqueous solution stored in the tank 210 is detected. Instead, the remaining amount of another additive solution may be detected.

What is claimed is:

1. An exhaust emission control apparatus that adds additive solution to exhaust gas from an internal combustion engine of a vehicle in order to purify the exhaust gas, the exhaust emission control apparatus comprising:
    a level sensor provided in a tank in which the additive solution is stored, the level sensor being configured to detect a liquid surface level that indicates the height of a liquid surface of the additive solution;
    a controller configured to
        (i) calculate a remaining amount of the additive solution inside the tank on the basis of the liquid surface level detected by the level sensor,
        (ii) calculate an available travel distance that the vehicle is allowed to travel while purifying exhaust gas by using the additive solution,
        (iii) store the calculated available travel distance, and
        (iv) calculate a period travel distance that is a travel distance of the vehicle from when the available travel distance is calculated to when the available travel distance is calculated next; and
    a readout provided in a cabin of the vehicle, the readout being configured to indicate the calculated available travel distance, wherein
    the controller is configured to, when the remaining amount of the additive solution exceeds a predetermined amount, execute a first calculation process in which the available travel distance is calculated with reference to the remaining amount of the additive solution, and
    the controller is configured to, after the remaining amount of the additive solution becomes smaller than or equal to the predetermined amount, execute a second calculation process in which the available travel distance is calculated by subtracting the period travel distance from the stored previously calculated available travel distance.

2. The exhaust emission control apparatus according to claim 1, wherein
    the controller is configured to acquire a speed of the vehicle, and
    the controller is configured to calculate the period travel distance on the basis of the speed at the time when the available travel distance is calculated and a calculation time interval of the available travel distance.

3. The exhaust emission control apparatus according to claim 1, wherein
    the controller is configured to indicate the available travel distance on the readout at a point in time at which the available travel distance becomes shorter than or equal to a predetermined value.

4. The exhaust emission control apparatus according to claim 1, wherein
    the predetermined amount is a remaining amount of the additive solution, at which a warning that prompts refilling of the tank with the additive solution is required.

5. The exhaust emission control apparatus according to claim 1, wherein
    the controller is configured to execute a process of calculating the available travel distance by multiplying an additive solution consumption rate by the remaining amount of the additive solution as the first calculation process, and the additive solution consumption rate indicates the ratio of a travel distance of the vehicle to a consumption of the additive solution.

6. A method for an exhaust emission control apparatus that adds additive solution to exhaust gas from an internal combustion engine of a vehicle in order to purify the exhaust gas, the exhaust emission control apparatus including a level sensor and a readout, the level sensor being provided in a tank that stores the additive solution, the level sensor being configured to detect a liquid surface level that indicates the height of a liquid surface of the additive solution, the readout being provided in a cabin of the vehicle, the readout being configured to indicate an available travel distance, the method comprising:
    calculating a remaining amount of the additive solution inside the tank on the basis of the liquid surface level detected by the level sensor;

calculating an available travel distance that the vehicle is allowed to travel while purifying exhaust gas by using the additive solution;

storing the calculated available travel distance;

calculating a period travel distance that is a travel distance of the vehicle from when the available travel distance is calculated to when the available travel distance is calculated next;

indicating on the readout the calculated available travel distance;

when the remaining amount of the additive solution exceeds a predetermined amount, executing a first calculation process in which the available travel distance is calculated with reference to the remaining amount of the additive solution; and after the remaining amount of the additive solution becomes smaller than or equal to the predetermined amount, executing a second calculation process in which the available travel distance is calculated by subtracting the period travel distance from the stored previously calculated available travel distance.

7. The method according to claim 6, further comprising:
acquiring a speed of the vehicle, wherein
the period travel distance is calculated on the basis of the speed at the time when the available travel distance is calculated and a calculation time interval of the available travel distance.

8. The method according to claim 6, further comprising:
indicating the available travel distance on the readout at a point in time at which the available travel distance becomes shorter than or equal to a predetermined value.

9. The method according to claim 6, wherein
the predetermined amount is a remaining amount of the additive solution, at which a warning that prompts refilling of the tank with the additive solution is required.

10. The method according to claim 6, wherein
a process of calculating the available travel distance by multiplying an additive solution consumption rate by the remaining amount of the additive solution is executed as the first calculation process, and the additive solution consumption rate indicates the ratio of a travel distance of the vehicle to a consumption of the additive solution.

* * * * *